United States Patent
Obiya et al.

(10) Patent No.: US 10,158,392 B2
(45) Date of Patent: Dec. 18, 2018

(54) TRANSMISSION-RECEPTION DEVICE

(71) Applicant: Murata Manufacturing Co., Ltd., Kyoto (JP)

(72) Inventors: Hidenori Obiya, Kyoto (JP); Shinya Mizoguchi, Kyoto (JP); Shinya Hitomi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/090,686

(22) Filed: Apr. 5, 2016

(65) Prior Publication Data

US 2016/0269072 A1 Sep. 15, 2016

Related U.S. Application Data

(63) Continuation of application No. PCT/JP2014/077374, filed on Oct. 15, 2014.

(30) Foreign Application Priority Data

Oct. 16, 2013 (JP) .................................. 2013-215146

(51) Int. Cl.
*H04B 1/525* (2015.01)
*H04L 5/00* (2006.01)
(Continued)

(52) U.S. Cl.
CPC ............... *H04B 1/525* (2013.01); *H04L 5/14* (2013.01); *H04L 5/001* (2013.01); *H04L 2027/0051* (2013.01)

(58) Field of Classification Search
CPC ......... H04B 1/525; H04L 5/0001; H04L 5/14; H04L 2027/0051
See application file for complete search history.

(56) References Cited

U.S. PATENT DOCUMENTS

| | | | | | |
|---|---|---|---|---|---|
| 5,428,831 A | * | 6/1995 | Monzello | ............... | H04B 1/126 455/278.1 |
| 6,865,276 B1 | * | 3/2005 | Ljungberg | .......... | G10L 21/0208 381/94.1 |

(Continued)

FOREIGN PATENT DOCUMENTS

| CN | 102111358 A | 6/2011 |
|---|---|---|
| JP | H09-312587 A | 12/1997 |

(Continued)

OTHER PUBLICATIONS

Written Opinion for PCT/JP2014/077374 dated Dec. 22, 2014.

(Continued)

*Primary Examiner* — David B. Lugo
(74) *Attorney, Agent, or Firm* — Pearne & Gordon LLP (57) ABSTRACT

A transmission-reception device includes an antenna duplexer, an antenna, and first and second transmission-reception circuits. A demultiplexer is connected between the first transmission-reception circuit and the antenna duplexer, and a multiplexer is connected between the second transmission-reception circuit and the antenna duplexer. A signal adjusting unit is connected between the demultiplexer and the multiplexer. The amplitude and phase of a third harmonic signal of a first transmission signal reflected by the antenna are detected. The signal adjusting unit adjusts the amplitude and phase of the third harmonic signal demultiplexed by the demultiplexer on the basis of the detection results, and outputs a cancel signal. The multiplexer synthesizes and hence cancels the third harmonic signal reflected by the antenna and the cancel signal with each other.

6 Claims, 8 Drawing Sheets

(51) Int. Cl.
*H04L 5/14* (2006.01)
*H04L 27/00* (2006.01)

(56) References Cited

U.S. PATENT DOCUMENTS

| | | | |
|---|---|---|---|
| 7,778,611 B2 | 8/2010 | Asai et al. | |
| 2002/0094791 A1* | 7/2002 | Pehlke | H03F 1/0272 |
| | | | 455/127.1 |
| 2007/0274372 A1 | 11/2007 | Asai et al. | |
| 2011/0134810 A1 | 6/2011 | Yamamoto et al. | |
| 2013/0260806 A1* | 10/2013 | Allpress | H04B 15/00 |
| | | | 455/501 |
| 2013/0322309 A1* | 12/2013 | Smith | H04L 5/001 |
| | | | 370/281 |
| 2014/0028491 A1* | 1/2014 | Ferguson | G01S 7/023 |
| | | | 342/122 |
| 2014/0194073 A1* | 7/2014 | Wyville | H04B 1/525 |
| | | | 455/73 |
| 2014/0247757 A1* | 9/2014 | Rimini | H04B 1/525 |
| | | | 370/278 |
| 2014/0300432 A1* | 10/2014 | Uejima | H04B 1/525 |
| | | | 333/132 |
| 2014/0376419 A1* | 12/2014 | Goel | H04B 1/525 |
| | | | 370/278 |
| 2015/0180685 A1* | 6/2015 | Noest | H04B 1/0475 |
| | | | 375/219 |
| 2015/0236840 A1* | 8/2015 | Link | H04B 15/00 |
| | | | 370/281 |
| 2016/0072542 A1* | 3/2016 | Din | H04B 1/0458 |
| | | | 370/295 |
| 2016/0134325 A1* | 5/2016 | Tageman | H04L 5/14 |
| | | | 455/83 |
| 2016/0156381 A1* | 6/2016 | Rydstrom | H04B 1/525 |
| | | | 370/286 |

FOREIGN PATENT DOCUMENTS

| | | |
|---|---|---|
| JP | 2007-318690 A | 12/2007 |
| JP | 2010-062997 A | 3/2010 |
| JP | 2010-171724 A | 8/2010 |
| JP | 2011-087137 A | 4/2011 |
| JP | 2011-120120 A | 6/2011 |
| JP | 2013-031135 A | 2/2013 |
| JP | WO 2013099568 A1 * | 7/2013 ............. H04B 1/525 |

OTHER PUBLICATIONS

International Search report for PCT/JP2014/077374 dated Dec. 22, 2014.

English translation of Written Opinion for PCT/JP2014/077374 dated Dec. 22, 2014.

* cited by examiner

TRANSMISSION-RECEPTION DEVICE

BACKGROUND

Technical Field

The present disclosure relates to a transmission-reception device compliant with carrier aggregation that simultaneously executes transmission and reception on a plurality of communication bands.

There is currently requested an increase in communication speed, and various communication devices compliant with carrier aggregation are suggested. For example, Patent Document 1 describes a communication device including a plurality of antennas. The antennas simultaneously execute transmission and reception on different communication bands.

However, the plurality of antennas may not be occasionally provided due to, for example, a decrease in size of the communication device.

In such a case, transmission and reception on the plurality of communication bands have to be simultaneously executed by using a single antenna. Transmission and reception on the plurality of communication bands are simultaneously executed with a single antenna by using a demultiplexer or the like.

Patent Document 1: Japanese Unexamined Patent Application Publication No. 2013-31135

BRIEF SUMMARY

However, when transmission on a first communication band and reception on a second communication band are simultaneously executed by using a common antenna, a transmission signal on the first communication band may enter a reception circuit for the second communication band and may deteriorate S/N of a reception signal on the second communication band.

In particular, if the harmonic frequency band of a transmission signal (a first transmission signal) on the first communication band is close to or overlaps the frequency band of a reception signal (a second reception signal) on the second communication band being different from the first communication band, S/N is more likely deteriorated.

The present disclosure provides a transmission-reception device that can restrict the deterioration in S/N of the reception signal when the carrier aggregation is executed.

A transmission-reception device according to the disclosure includes a first RF circuit, a second RF circuit, an antenna, and an antenna duplexer. The first RF circuit includes at least a transmission circuit that transmits a transmission signal on a first communication band. The second RF circuit includes at least a reception circuit that receives a reception signal on a second communication band different from the first communication band. The antenna transmits the transmission signal on the first communication band to an external device and receives the reception signal on the second communication band from the external device. The antenna duplexer is connected between the antenna and the first and second RF circuits, transfers the transmission signal from the first RF circuit to the antenna, and transfers the reception signal from the antenna to the second RF circuit.

Further, the transmission-reception device according to the disclosure includes a demultiplexer, a sensing unit, a control unit, a signal adjusting unit, and a multiplexer. The demultiplexer demultiplexes the transmission signal on the first communication band. The sensing unit detects the transmission signal on the first communication band. The control unit determines an adjustment coefficient on the basis of a detection result of the sensing unit. The signal adjusting unit adjusts at least one of an amplitude and a phase of a harmonic signal demultiplexed by the demultiplexer, on the basis of the adjustment coefficient. The multiplexer is connected between the antenna duplexer and the second RF circuit, and multiplexes the transmission signal adjusted by the signal adjusting unit and the signal to be transferred from the antenna duplexer to the second RF circuit.

With this configuration, the harmonic signal of the transmission signal output from the first RF circuit is canceled with the harmonic signal which is demultiplexed by the demultiplexer and the amplitude and phase of which are adjusted by the signal adjusting unit, even if the harmonic signal of the transmission signal output from the first RF circuit enters the second RF circuit side.

Also, with the transmission-reception device according to the disclosure, the sensing unit may be connected between the antenna and the antenna duplexer.

With this configuration, the harmonic signal of the transmission signal reflected by the antenna can be more precisely detected. Accordingly, the adjustment coefficient can be more precisely set and more precise signal canceling can be provided.

Also, the transmission-reception device according to the disclosure may have the following configurations. The sensing unit detects the amplitude and the phase of the harmonic signal of the transmission signal reflected by the antenna, and an amplitude and a phase of a fundamental wave signal of the transmission signal to be transferred to the antenna. The control unit determines a first adjustment coefficient on the basis of detection results of the amplitude and the phase of the harmonic signal, and determines a second adjustment coefficient on the basis of detection results of the amplitude and the phase of the fundamental wave signal. The signal adjusting unit includes a first signal adjusting unit and a second signal adjusting unit. The first signal adjusting unit adjusts the amplitude and the phase of the harmonic signal demultiplexed by the demultiplexer, on the basis of the first adjustment coefficient. The second signal adjusting unit adjusts the amplitude and the phase of the harmonic signal demultiplexed by the demultiplexer, on the basis of the second adjustment coefficient.

With this configuration, the harmonic signal reflected by the antenna and the harmonic signal leaking from the first RF circuit side to the second RF circuit side through the antenna duplexer can be more precisely canceled with the harmonic signal which is demultiplexed by the demultiplexer and the amplitude and the phase of which are adjusted by the signal adjusting unit, more precisely.

Also, in the transmission-reception device according to the disclosure, the signal adjusting unit may include a plurality of signal adjusting units.

With this configuration, the harmonic signal reflected by the antenna can be more precisely canceled.

Also, in the transmission-reception device according to the disclosure, the signal adjusting unit may further include a delay circuit that delays the harmonic signal demultiplexed by the demultiplexer.

With this configuration, the harmonic signal which is demultiplexed by the demultiplexer and the amplitude and the phase of which are adjusted by the signal adjusting unit can be delayed in accordance with the length of the transfer path of the harmonic signal leaking to the second RF circuit side. Accordingly, the signals can be more precisely canceled with each other.

Also, in the transmission-reception device according to the disclosure, the signal adjusting unit includes a filter that is connected to the demultiplexer, attenuates the transmission signal, and allows the harmonic signal of the transmission signal to pass therethrough.

With this configuration, the harmonic signal of the transmission signal can be input to the signal adjusting unit and transferred to the antenna without necessarily inputting the fundamental wave signal of the transmission signal to the signal adjusting unit. Accordingly, the transmission-reception device having good transfer characteristics for the transmission signal can be provided.

With the disclosure, the deterioration in S/N of the reception signal when the carrier aggregation is executed can be restricted.

DETAILED DESCRIPTION

Figure 1:
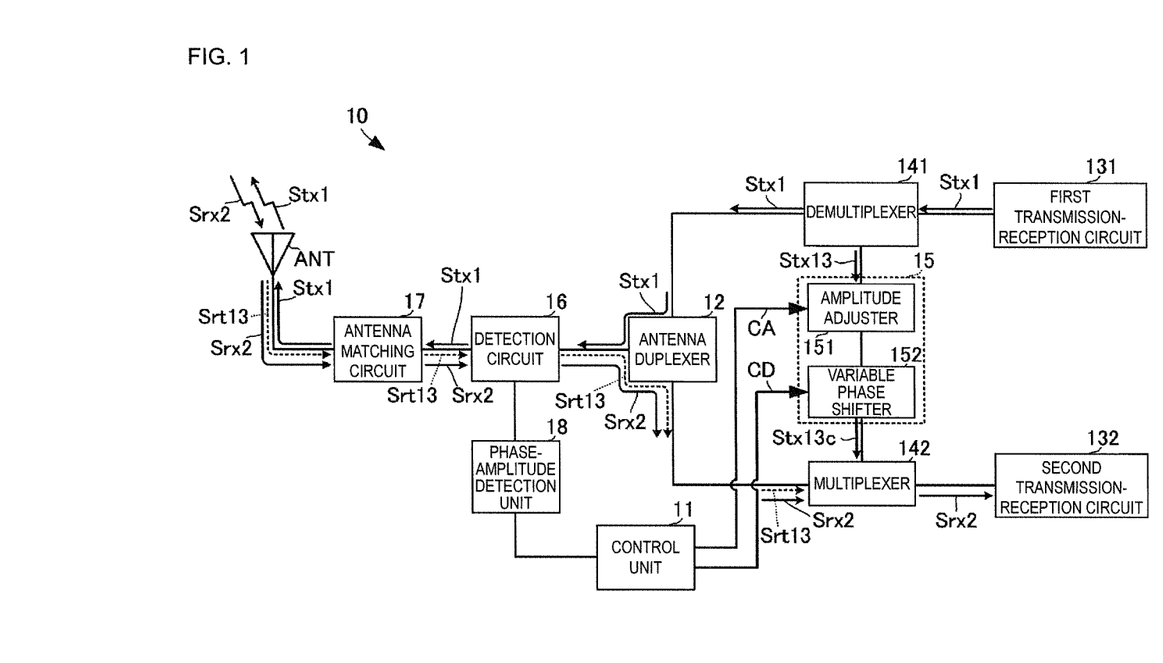
FIG. 1 is a circuit block diagram of a transmission-reception device according to a first embodiment of the present disclosure.

A transmission-reception device according to a first embodiment of the present disclosure is described with reference to the drawings. FIG. 1 is a circuit block diagram of the transmission-reception device according to the first embodiment of the present disclosure.

A transmission-reception device 10 includes a control unit 11, an antenna duplexer 12, first and second transmission-reception circuits 131 and 132, a demultiplexer 141, a multiplexer 142, a signal adjusting unit 15, a detection circuit 16, an antenna matching circuit 17, a phase-amplitude detection unit 18, and an antenna ANT. The first transmission-reception circuit 131 corresponds to a first RF circuit of the present disclosure, the second transmission-reception circuit 132 corresponds to a second RF circuit of the present disclosure, and a circuit including the detection circuit 16 and the phase-amplitude detection unit 18 correspond to a sensing unit of the present disclosure.

The first transmission-reception circuit 131, the second transmission-reception circuit 132, and the antenna ANT are connected to the antenna duplexer 12. The first transmission-reception circuit 131 executes transmission processing for a transmission signal and reception processing for a reception signal on a first communication band. However, the first transmission-reception circuit 131 may only have a function of executing the transmission processing on the first communication band. The second transmission-reception circuit 132 executes transmission processing for a transmission signal and reception processing for a reception signal on a second communication band. However, the second transmission-reception circuit 132 may only have a function of executing the reception processing on the second communication band. The first and second communication bands use different frequency bands. For example, the first communication is Band 17, and the second communication band is Band 4.

The first and second transmission-reception circuits 131 and 132 execute transmission and reception by carrier aggregation that simultaneously execute transmission and reception. As a more specific aspect, transmission of a transmission signal (a first transmission signal) Stx1 on the first communication band and reception of a reception signal (a second reception signal) Srx2 on the second communication band are simultaneously executed.

The antenna duplexer 12 transfers the transmission signal (the first transmission signal) Stx1 and a reception signal (a first reception signal) on the first communication band between the first transmission-reception circuit 131 and the antenna ANT with low loss. The antenna duplexer 12 transfers a transmission signal (a second transmission signal) and the reception signal (the second reception signal) Srx2 on the second communication band between the second transmission-reception circuit 132 and the antenna ANT with low loss.

The demultiplexer 141 is connected between the first transmission-reception circuit 131 and the antenna duplexer 12. The multiplexer 142 is connected between the second transmission-reception circuit 132 and the antenna duplexer 12. The signal adjusting unit 15 is connected between the demultiplexer 141 and the multiplexer 142. The signal adjusting unit 15 includes an amplitude adjuster 151 and a variable phase shifter 152. These amplitude adjuster 151 and variable phase shifter 152 are connected in series between the demultiplexer 141 and the multiplexer 142.

The detection circuit 16 and the antenna matching circuit 17 are connected in series between the antenna duplexer 12 and the antenna ANT. At this time, the detection circuit 16 and the antenna matching circuit 17 are connected in series so that the detection circuit 16 is at the antenna duplexer 12 side and the antenna matching circuit 17 is at the antenna ANT side.

The detection circuit 16 detects the first transmission signal Stx1 and a reflected signal generated as the result that the first transmission signal Stx1 is reflected by the antenna ANT. This detection circuit 16 is formed of, for example, a bidirectional coupler. The detection circuit 16 separates and individually outputs the first transmission signal Stx1 and the reflected signal. The detection circuit 16 outputs a detection signal for a high frequency signal transferred between the antenna ANT and the antenna duplexer 12 to the phase-amplitude detection unit 18.

The phase-amplitude detection unit 18 detects the amplitude difference between the first transmission signal Stx1 and the reflected signal output from the detection circuit 16, and detects the phase difference between the first transmission signal Stx1 and the reflected signal output from the detection circuit 16.

The antenna matching circuit 17 executes impedance matching between the antenna ANT and the antenna duplexer 12. The antenna matching circuit 17 is an impedance-variable impedance matching circuit.

The phase-amplitude detection unit 18 is connected to the control unit 11. The control unit 11 is connected to the signal adjusting unit 15.

The transmission-reception device 10 having the above-described circuit configuration operates as follows when carrier aggregation on the first and second communication bands is executed, or more particularly when transmission of the first transmission signal Stx1 being the transmission signal on the first communication band and reception of the second reception signal Srx2 being the reception signal on the second communication band are simultaneously executed.

A case in which Band 17 is used as the first communication band and Band 4 is used as the second communication band is described below; however, the configuration of this embodiment can be also applied to carrier aggregation on other frequency bands, and similar advantageous effects can be obtained.

The first transmission-reception circuit 131 generates the first transmission signal Stx1 and outputs the first transmission signal Stx1 to the antenna duplexer 12 side. The demultiplexer 141 demultiplexes a harmonic signal of the first transmission signal Stx1, or more particularly in this embodiment, a third harmonic signal Stx13 of the first transmission signal Stx1 on Band 17. The demultiplexed third harmonic signal Stx13 is input to the signal adjusting unit 15.

The antenna duplexer 12 transfers the first transmission signal Stx1 to the antenna ANT side. The first transmission signal Stx1 output from the antenna duplexer 12 is supplied to the antenna ANT through the detection circuit 16 and the antenna matching circuit 17. At this time, since the impedance matching by the antenna matching circuit 17 is executed, the first transmission signal Stx1 is transmitted from the antenna ANT to an external device almost without necessarily being reflected by the antenna ANT unless load variation occurs at the antenna ANT due to an external factor.

However, if load variation occurs at the antenna ANT, the first transmission signal Stx1 is partly reflected by the antenna ANT and is transferred to the antenna duplexer 12 side. At this time, a third harmonic signal Srt13 of the first transmission signal Stx1 due to reflection is also transferred to the antenna duplexer 12 side. The third harmonic signal Srt13 may be generated although load variation does not occur at the antenna ANT. The third harmonic signal Srt13 due to reflection may be transferred to the antenna duplexer 12 side.

The detection circuit 16 detects the first transmission signal Stx1 and the third harmonic signal Srt13 due to reflection. The phase-amplitude detection unit 18 detects the amplitude difference and the phase difference between the first transmission signal Stx1 and the third harmonic signal Srt13 due to reflection. The phase-amplitude detection unit 18 outputs the amplitude difference and the phase difference between the first transmission signal Stx1 and the third harmonic signal Srt13 due to reflection to the control unit 11.

Figure 2:
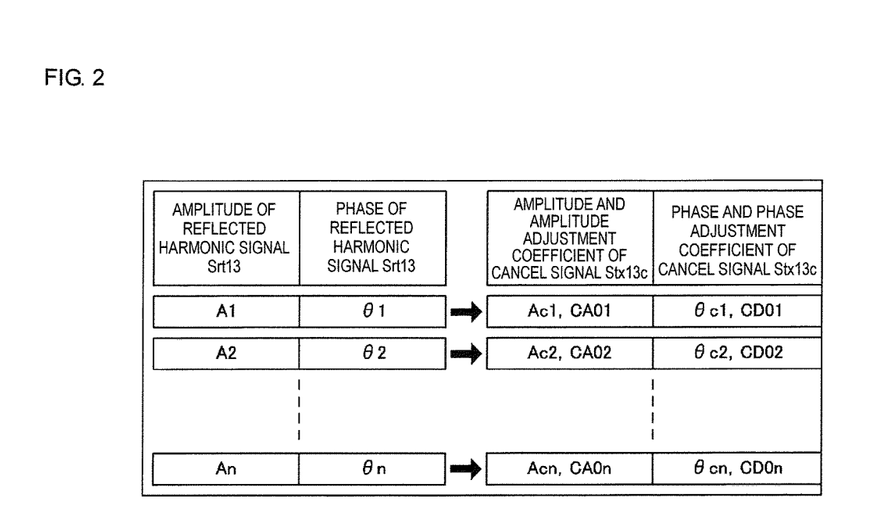
FIG. 2 is an illustration showing a setting table for an amplitude adjustment coefficient CA and a phase adjustment coefficient CD.

The control unit 11 sets an amplitude adjustment coefficient CA and a phase adjustment coefficient CD on the basis of the amplitude and phase of the third harmonic signal Srt13 due to reflection. FIG. 2 is an illustration showing a setting table for the amplitude adjustment coefficient CA and the phase adjustment coefficient CD.

The amplitude adjustment coefficient CA is a coefficient for determining the amplitude of a cancel signal Stx13c that is output from the signal adjusting unit 15, in accordance with the amplitude of the third harmonic signal Srt13 due to reflection. The phase adjustment coefficient CD is a coefficient for determining the phase of the cancel signal Stx13c that is output from the signal adjusting unit 15, in accordance with the phase of the third harmonic signal Srt13 due to reflection. To be more specific, the amplitude adjustment coefficient CA and the phase adjustment coefficient CD are coefficients determined so that the amplitude of the third harmonic signal Srt13 due to reflection is the same as the amplitude of the cancel signal Stx13c, and the phase of the third harmonic signal Srt13 due to reflection is the reversal of the phase of the cancel signal Stx13c at the time of input to the multiplexer 142.

For example, if the third harmonic signal Srt13 due to reflection has an amplitude of A1 and a phase of θ1, amplitude and phase adjustment coefficients CA01 and CD01 are set so that the cancel signal Stx13c has an amplitude of Ac1 and a phase of θc1. Also, if the third harmonic signal Srt13 due to reflection has an amplitude of A2 and a phase of θ2, amplitude and phase adjustment coefficients CA02 and CD02 are set so that the cancel signal Stx13c has an amplitude of Ac2 and a phase of θc2.

The control unit 11 gives the amplitude adjustment coefficient CA to the amplitude adjuster 151 of the signal adjusting unit 15, and gives the phase adjustment coefficient CD to the phase adjuster 152 of the signal adjusting unit 15.

The amplitude adjuster 151 adjusts the amplitude of the demultiplexed third harmonic signal Stx13 on the basis of the amplitude adjustment coefficient CA. The phase adjuster 152 adjusts the phase of the third harmonic signal Stx13 with the adjusted amplitude, on the basis of the phase adjustment coefficient CD. The third harmonic signal Stx13 with the adjusted amplitude and phase becomes the cancel signal Stx13c, and is output to the multiplexer 142.

The multiplexer 142 multiplexes the high frequency signal from the antenna duplexer 12, that is, the high frequency signal in which the second reception signal Srx2 received by the antenna ANT and the third harmonic signal Srt13 due to reflection are mixed, with the cancel signal Stx13c, and outputs the multiplexed signal to the second transmission-reception circuit 132.

At this time, since the third harmonic signal Srt13 due to reflection and the cancel signal Stx13c have the same amplitude and the reversal phases, the signals are canceled with each other. Accordingly, only the second reception signal Srx2 is output from the multiplexer 142 to the second transmission-reception circuit 132.

As described above, with the configuration of this embodiment, the third harmonic signal of the transmission signal on the first communication band reflected by the antenna ANT is prevented from being input to the second transmission-reception circuit 132 for the second communication band. Accordingly, even when the first transmission signal and the second reception signal are simultaneously transmitted and received, the signals can be received and demodulated without necessarily deterioration in S/N of the second reception signal.

In particular, like the configuration of this embodiment, since the detection circuit 16 for the harmonic signal is connected between the antenna ANT and the antenna duplexer 12, the amplitude and phase of the harmonic signal reflected by the antenna ANT can be precisely detected. Accordingly, the cancel signal can be highly precisely generated, and canceling between the harmonic signal and the cancel signal can be more precisely executed.

Figure 3:
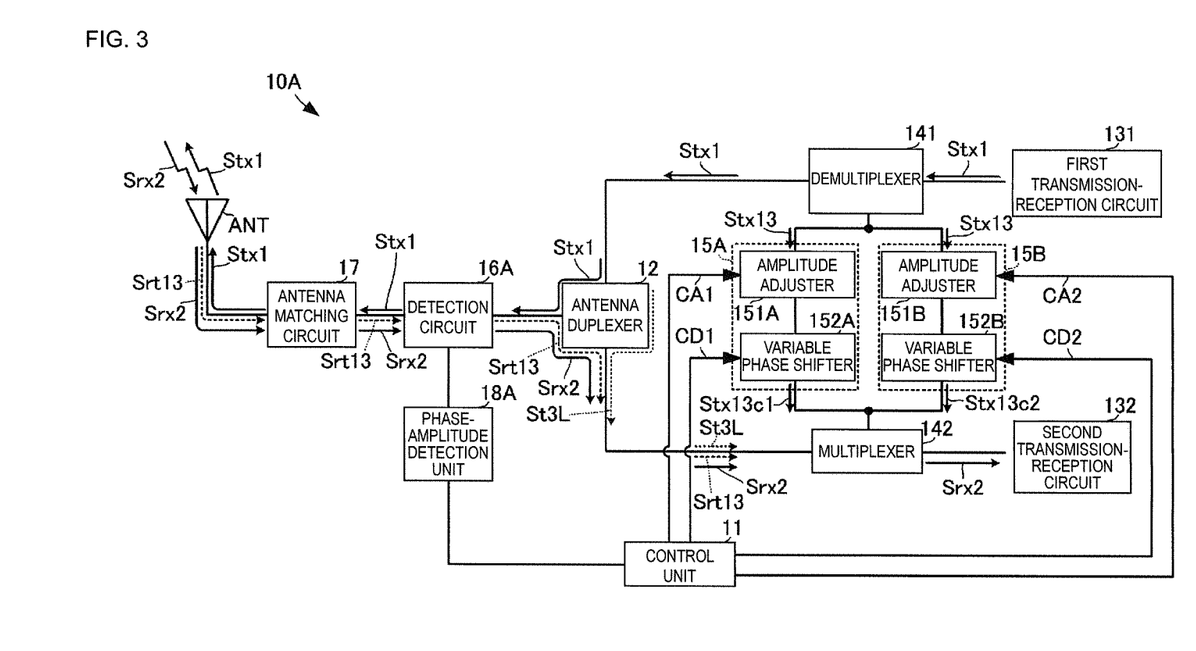
FIG. 3 is a circuit block diagram of a transmission-reception device according to a second embodiment of the present disclosure.

Next, a transmission-reception device according to a second embodiment of the present disclosure is described with reference to the drawings. FIG. 3 is a circuit block diagram of the transmission-reception device according to the second embodiment of the present disclosure.

A transmission-reception device 10A according to this embodiment differs from the transmission-reception device 10 according to the first embodiment in that the transmission-reception device 10A includes signal adjusting units 15A and 15B. Also, the transmission-reception device 10A according to this embodiment differs from the transmission-reception device according to the first embodiment in that adjustment coefficients are given to the signal adjusting units 15A and 15B. Therefore, in the following description, only portions different from the transmission-reception device 10 according to the first embodiment are specifically described.

The signal adjusting units 15A and 15B are connected between the demultiplexer 141 and the multiplexer 142.

The signal adjusting unit 15A includes an amplitude adjuster 151A and a variable phase shifter 152A. The signal adjusting unit 15B includes an amplitude adjuster 151B and a variable phase shifter 152B.

A detection circuit 16A detects the first transmission signal Stx1 and the reflected signal generated as the result that the first transmission signal Stx1 is reflected by the antenna ANT. This detection circuit 16A is formed of, for example, a bidirectional coupler. The detection circuit 16A separates and individually outputs the first transmission signal Stx1 and the reflected signal. The detection circuit 16A outputs the detection signal for the high frequency signal transferred between the antenna ANT and the antenna duplexer 12 to a phase-amplitude detection unit 18A.

The phase-amplitude detection unit 18A detects the amplitude difference between the first transmission signal Stx1 and the reflected signal output from the detection circuit 16A, and detects the phase difference between the first transmission signal Stx1 and the reflected signal output from the detection circuit 16A.

Figure 4:
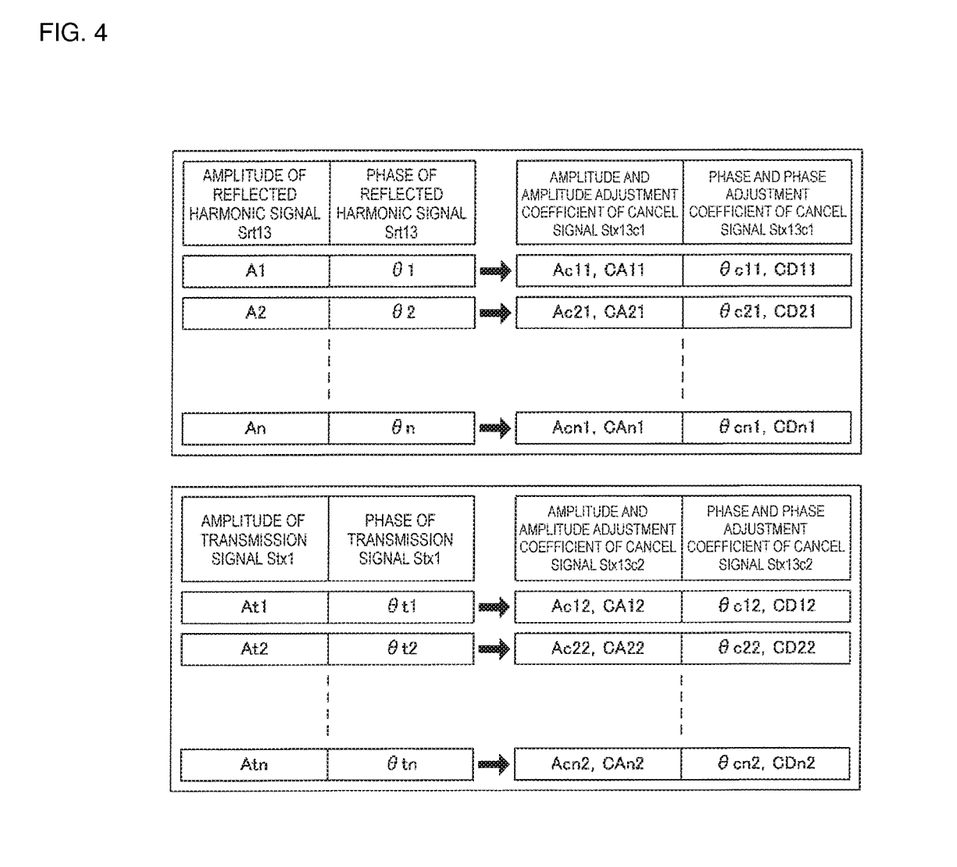
FIG. 4 is an illustration showing a setting table for amplitude adjustment coefficients CA1 and CA2, and phase adjustment coefficients CD1 and CD2.

The control unit 11 sets an amplitude adjustment coefficient CA1 and a phase adjustment coefficient CD1 on the basis of the amplitude and phase of the third harmonic signal Srt13 due to reflection. The control unit 11 sets an amplitude adjustment coefficient CA2 and a phase adjustment coefficient CD2 on the basis of the amplitude and phase of the first transmission signal Stx1. FIG. 4 is an illustration showing a setting table for the amplitude adjustment coefficients CA1 and CA2, and the phase adjustment coefficients CD1 and CD2.

The amplitude adjustment coefficient CA1 is a coefficient for determining the amplitude of a cancel signal Stx13$c$1 that is output from the signal adjusting unit 15A, in accordance with the amplitude of the third harmonic signal Srt13 due to reflection. The phase adjustment coefficient CD1 is a coefficient for determining the phase of the cancel signal Stx13$c$1 that is output from the signal adjusting unit 15A, in accordance with the phase of the third harmonic signal Srt13 due to reflection.

To be more specific, the amplitude adjustment coefficient CA1 and the phase adjustment coefficient CD1 are coefficients determined so that the amplitude of the third harmonic signal Srt13 due to reflection is the same as the amplitude of the cancel signal Stx13$c$1, and the phase of the third harmonic signal Srt13 due to reflection is the reversal of the phase of the cancel signal Stx13$c$1 at the time of input to the multiplexer 142.

For example, if the third harmonic signal Srt13 due to reflection has the amplitude of A1 and the phase of θ1, amplitude and phase adjustment coefficients CA11 and CD11 are set so that the cancel signal Stx13$c$1 has an amplitude of Ac11 and a phase of θc11. Also, if the third harmonic signal Srt13 due to reflection has the amplitude of A2 and the phase of θ2, amplitude and phase adjustment coefficients CA21 and CD21 are set so that the cancel signal Stx13$c$1 has an amplitude of Ac21 and a phase of θc21.

The amplitude adjustment coefficient CA2 is a coefficient for determining the amplitude of a cancel signal Stx13$c$2 that is output from the signal adjusting unit 15B, in accordance with the amplitude of the first transmission signal Stx1. The phase adjustment coefficient CD2 is a coefficient for determining the phase of the cancel signal Stx13$c$2 that is output from the signal adjusting unit 15B, in accordance with the phase of the first transmission signal Stx1.

To be more specific, the amplitude adjustment coefficient CA2 and the phase adjustment coefficient CD2 are coefficients determined so that the amplitude of a third harmonic signal St3L of the first transmission signal Stx1 leaking from the first transmission-reception circuit 131 side to the second transmission-reception circuit 132 side of the antenna duplexer 12 is the same as the amplitude of the cancel signal Stx13$c$2, and the phase of the third harmonic signal St3L is the reversal of the phase of the cancel signal Stx13$c$2 at the time of input to the multiplexer 142. The relationship between the amplitude and phase of the first transmission signal Stx1 transferred to the antenna ANT and the amplitude and phase of the third harmonic signal St3L of the first transmission signal Stx1 leaking through the antenna duplexer 12 can be previously obtained by a simulation or the like.

For example, if the first transmission signal Stx1 has an amplitude of At1 and a phase of θt1, since the amplitude and phase of the third harmonic signal St3L of the first transmission signal Stx1 leaking through the antenna duplexer 12 can be figured out, an amplitude adjustment coefficient CA12 and a phase adjustment coefficient CD12 are set so that the cancel signal Stx13$c$2 has an amplitude of Ac12 and a phase of θc12 in accordance with the amplitude and phase. Also, if the first transmission signal Stx1 has the amplitude of At2 and the phase of θt2, an amplitude adjustment coefficient CA22 and a phase adjustment coefficient CD22 are set so that the cancel signal Stx13$c$2 has an amplitude of Ac22 and a phase of θc22.

The control unit 11 gives the amplitude adjustment coefficient CA1 to the amplitude adjuster 151A of the signal adjusting unit 15A, and gives the phase adjustment coefficient CD1 to the phase adjuster 152A of the signal adjusting unit 15A. The control unit 11 gives the amplitude adjustment coefficient CA2 to the amplitude adjuster 151B of the signal adjusting unit 15B, and gives the phase adjustment coefficient CD2 to the phase adjuster 152B of the signal adjusting unit 15B.

The amplitude adjuster 151A adjusts the amplitude of the demultiplexed third harmonic signal Stx13 on the basis of the amplitude adjustment coefficient CA1. The phase adjuster 152A adjusts the phase of the third harmonic signal Stx13 with the adjusted amplitude on the basis of the phase adjustment coefficient CD1. The third harmonic signal Stx13 with the adjusted amplitude and phase becomes the cancel signal Stx13$c$1, and is output to the multiplexer 142.

The amplitude adjuster 151B adjusts the amplitude of the demultiplexed third harmonic signal Stx13 on the basis of the amplitude adjustment coefficient CA2. The phase adjuster 152B adjusts the phase of the third harmonic signal Stx13 with the adjusted amplitude on the basis of the phase adjustment coefficient CD2. The third harmonic signal Stx13 with the adjusted amplitude and phase becomes the cancel signal Stx13c2, and is output to the multiplexer 142.

The multiplexer 142 multiplexes the high frequency signal from the antenna duplexer 12, that is, the high frequency signal in which the second reception signal Srx2 received by the antenna ANT, the third harmonic signal Srt13 due to reflection, and the third harmonic signal St3L leaking through the antenna duplexer 12 are mixed, with the cancel signals Stx13c1 and Stx13c2, and outputs the multiplexed signal to the second transmission-reception circuit 132.

At this time, since the third harmonic signal Srt13 due to reflection and the cancel signal Stx13c1 have the same amplitude and the reversal phases, the signals are canceled with each other. Also, since the third harmonic signal St3L leaking through the antenna duplexer 12 and the cancel signal Stx13c2 have the same amplitude and the reversal phases, the signals are canceled with each other. Accordingly, only the second reception signal Srx2 is output from the multiplexer 142 to the second transmission-reception circuit 132.

As described above, with the configuration of this embodiment, the third harmonic signal of the transmission signal on the first communication band reflected by the antenna ANT is prevented from being input to the second transmission-reception circuit 132 for the second communication band. Further, with the configuration of this embodiment, the third harmonic signal of the transmission signal on the first communication band leaking through the antenna duplexer 12 is prevented from being input to the second transmission-reception circuit 132 for the second communication band. Accordingly, even when the first transmission signal and the second reception signal are simultaneously transmitted and received, the deterioration in S/N of the second reception signal can be further restricted.

Figure 5:
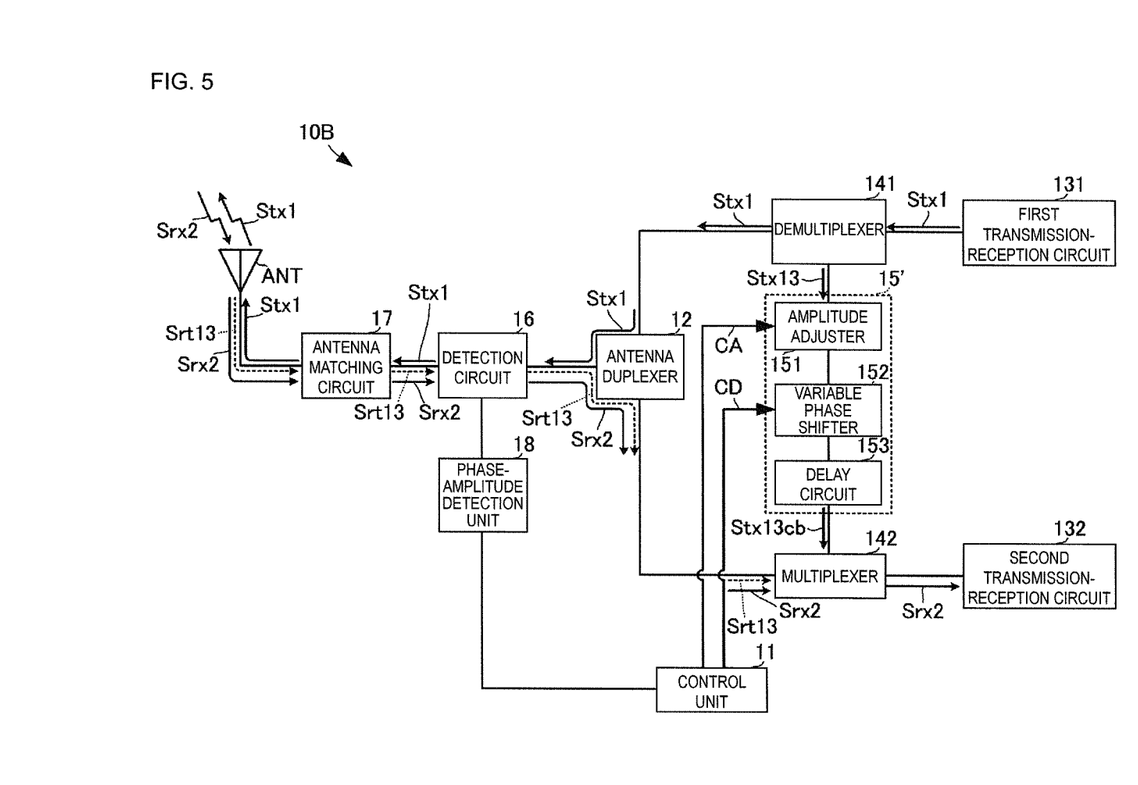
FIG. 5 is a circuit block diagram of a transmission-reception device according to a third embodiment of the present disclosure.

Next, a transmission-reception device according to a third embodiment of the present disclosure is described with reference to the drawing. FIG. 5 is a circuit block diagram of the transmission-reception device according to the third embodiment of the present disclosure.

A transmission-reception device 10B according to this embodiment differs from the transmission-reception device 10 according to the first embodiment in that the transmission-reception device 10B includes a signal adjusting unit 15'. Therefore, in the following description, only portions different from the transmission-reception device 10 according to the first embodiment are specifically described.

The signal adjusting unit 15' includes the amplitude adjuster 151, the variable phase shifter 152, and a delay circuit 153. The amplitude adjuster 151 and the variable phase shifter 152 are the same as those of the signal adjusting unit 15 according to the first embodiment.

The delay circuit 153 executes delay processing on the third harmonic signal Stx13 with the adjusted amplitude and phase, and outputs a cancel signal Stx13cb. The delay amount of the delay circuit 153 is determined on the basis of the difference between the transfer path length of the third harmonic signal from the demultiplexer 141 to the multiplexer 142 and the transfer path length of the third harmonic signal from the demultiplexer 141 through reflection at the antenna ANT to the multiplexer 142. The delay circuit 153 may be grounded at the demultiplexer 141 side.

With such a configuration, the reflected harmonic signal and the cancel signal can be more precisely canceled with each other at the multiplexer 142.

In this embodiment, the aspect in which the delay circuit 153 is added to the transmission-reception device 10 according to the first embodiment is described. However, the delay circuit may be similarly added to the transmission-reception device 10A according to the second embodiment. In this case, the delay circuit may be arranged at each of the signal adjusting units 15A and 15B. To be more specific, the delay amount of the delay circuit arranged at the signal adjusting unit 15A is determined on the basis of the difference between the transfer path length of the third harmonic signal from the demultiplexer 141 to the multiplexer 142 and the transfer path length of the third harmonic signal from the demultiplexer 141 through reflection at the antenna ANT to the multiplexer 142. The delay amount of the delay circuit arranged at the signal adjusting unit 15B is determined on the basis of the difference between the transfer path length of the third harmonic signal from the demultiplexer 141 to the multiplexer 142 and the transfer path length of the third harmonic signal from the demultiplexer 141 through the antenna duplexer 12 to the multiplexer 142.

Figure 6:
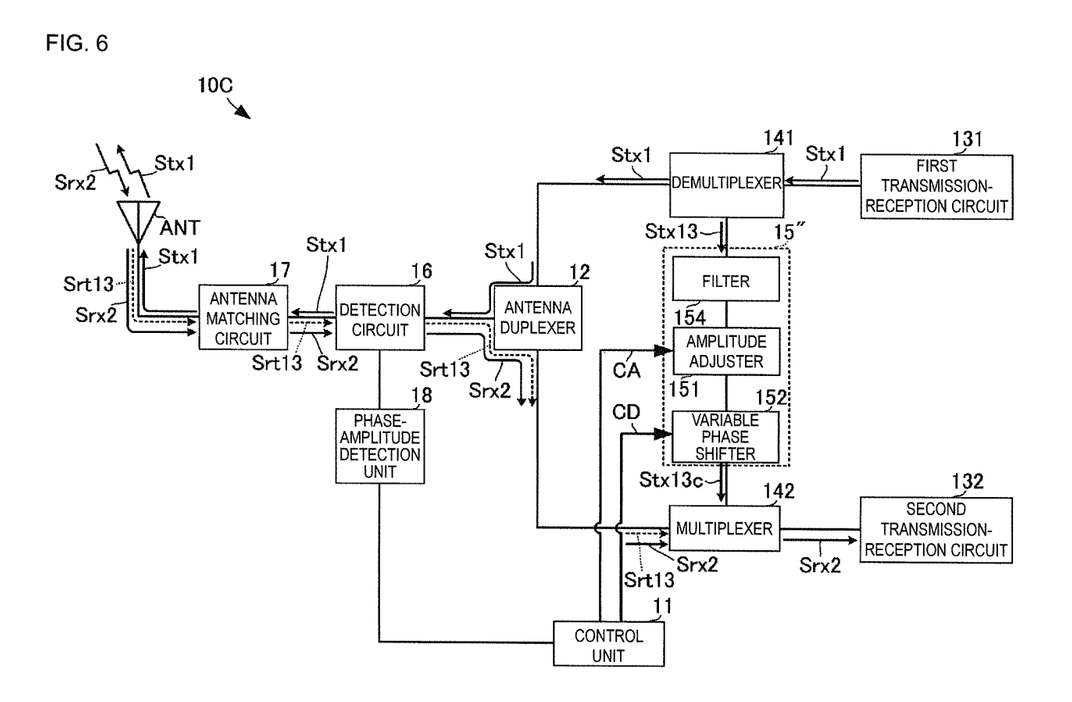
FIG. 6 is a circuit block diagram of a transmission-reception device according to a fourth embodiment of the present disclosure.

Next, a transmission-reception device according to a fourth embodiment of the present disclosure is described with reference to the drawing. FIG. 6 is a circuit block diagram of the transmission-reception device according to the fourth embodiment of the present disclosure.

A transmission-reception device 10C according to this embodiment differs from the transmission-reception device 10 according to the first embodiment in that the transmission-reception device 10C includes a signal adjusting unit 15". Therefore, in the following description, only portions different from the transmission-reception device 10 according to the first embodiment are specifically described.

The signal adjusting unit 15" includes the amplitude adjuster 151, the variable phase shifter 152, and a filter 154. The amplitude adjuster 151 and the variable phase shifter 152 are the same as those of the signal adjusting unit 15 according to the first embodiment.

The filter 154 is connected between the demultiplexer 141 and the amplitude adjuster 151. In other words, the filter 154 is connected to the demultiplexer 141 without necessarily any circuit element interposed therebetween. The filter 154 cuts off a fundamental wave signal of the first transmission signal Stx1 and allows only the third harmonic signal Stx13 of the first transmission signal Stx1 to pass therethrough. Accordingly, the fundamental wave signal of the first transmission signal Stx1 does not leak to the signal adjusting unit 15" and is transferred to the antenna duplexer 12 while the third harmonic signal Stx13 is taken into the signal adjusting unit 15". That is, the fundamental wave signal of the first transmission signal Stx1 output from the first transmission-reception circuit 131 can be transferred to the antenna duplexer 12 with low loss.

Also, the first transmission signal Stx1 can be prevented from leaking to the second transmission-reception circuit 132 through the demultiplexer 141, the signal adjusting unit 15", and the multiplexer 142.

In this embodiment, the aspect in which the filter 154 is added to the transmission-reception device 10 according to the first embodiment is described. However, the filter 154 may be similarly added to any one of the transmission-reception devices 10A and 10B according to the second and third embodiments.

Figure 7:
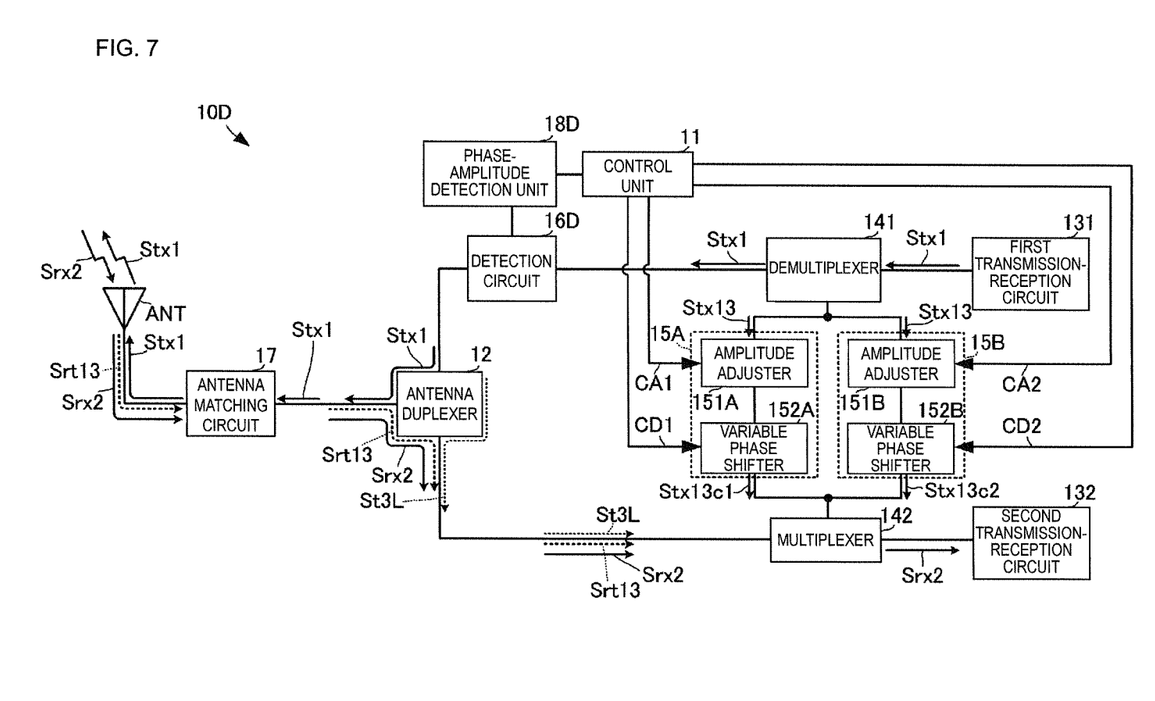
FIG. 7 is a circuit block diagram of a transmission-reception device according to a fifth embodiment of the present disclosure.

Next, a transmission-reception device according to a fifth embodiment of the present disclosure is described with reference to the drawing. FIG. 7 is a circuit block diagram of the transmission-reception device according to the fifth embodiment of the present disclosure.

A transmission-reception device 10D according to this embodiment differs from the transmission-reception device 10A according to the second embodiment for the arrangement position of a detection circuit 16D. Therefore, in the following description, only portions different from the transmission-reception device 10A according to the second embodiment are specifically described.

In the transmission-reception device 10D, the detection circuit 16D is connected between the demultiplexer 141 and the antenna duplexer 12. The detection circuit 16D detects the first transmission signal Stx1, and a phase-amplitude detection unit 18D detects the amplitude and phase of the first transmission signal Stx1. The phase-amplitude detection unit 18D outputs the amplitude and phase of the first transmission signal Stx1 to the control unit 11.

The relationship between the amplitude and phase of the first transmission signal Stx1 input to the antenna duplexer 12 and the amplitude and phase of the third harmonic signal St3L of the first transmission signal Stx1 leaking through the antenna duplexer 12; and the relationship between the amplitude and phase of the first transmission signal Stx1 input to the antenna duplexer 12 and the amplitude and phase of the third harmonic signal Srt13 due to reflection can be previously obtained by a simulation or the like.

The control unit 11 sets the amplitude adjustment coefficients CA1 and CA2, and the phase adjustment coefficients CD1 and CD2 on the basis of the amplitude and phase of the first transmission signal Stx1.

As described above, even if the arrangement of the detection circuit is changed, advantageous effects similar to those of the respective embodiments can be obtained.

Each of the above-described embodiments describes the example in which the frequency component of the third harmonic signal included in the transmission signal is suppressed. However, by using each of the above-described embodiments, the other frequency component of the transmission signal can be also suppressed. That is, the respective components included in the first transmission signal entering the second transmission-reception circuit can be suppressed. Also, by adjusting the coefficients, noise included in the transmission signal can be suppressed.

Figure 8:
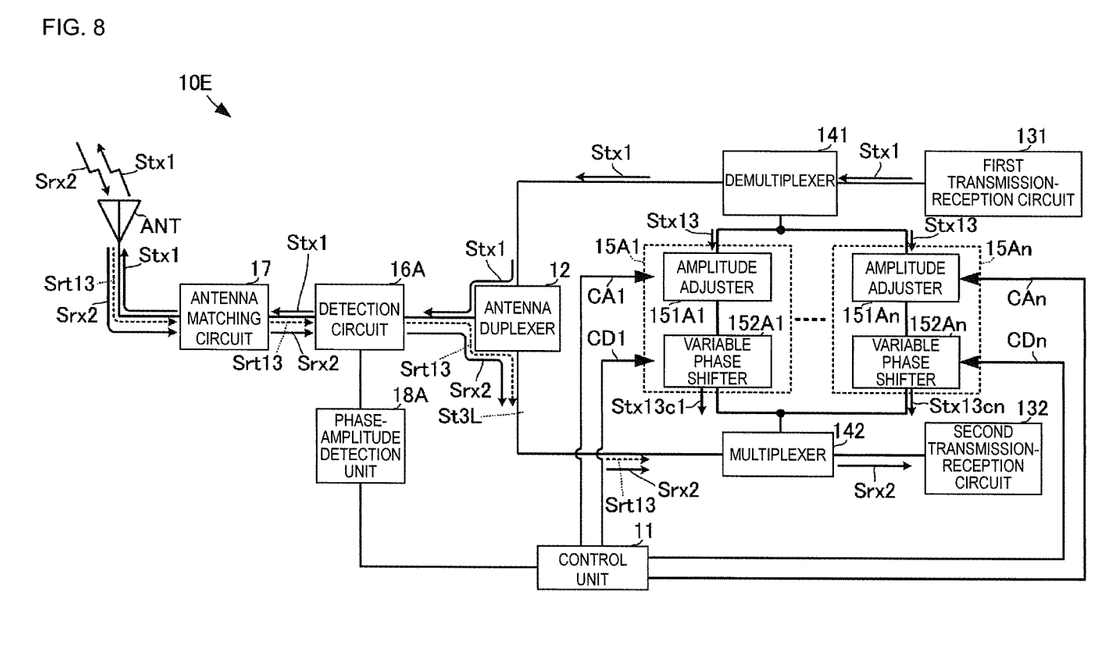
FIG. 8 is a circuit block diagram of a transmission-reception device according to a sixth embodiment of the present disclosure.

Next, a transmission-reception device according to a sixth embodiment of the present disclosure is described with reference to the drawing. FIG. 8 is a circuit block diagram of the transmission-reception device according to the sixth embodiment of the present disclosure.

A transmission-reception device 10E according to this embodiment differs from the transmission-reception device 10A according to the second embodiment in that the transmission-reception device 10E includes a plurality of signal adjusting units 15A1 to 15An. Therefore, in the following description, only portions different from the transmission-reception device 10A according to the second embodiment are specifically described. In this embodiment, while an aspect including a number n of signal adjusting units is described; however, the number n may be appropriately set.

The signal adjusting unit 15A1 includes an amplitude adjuster 151A1 and a variable phase shifter 152A1. The amplitude adjuster 151A1 and the variable phase shifter 152A1 are connected in series between the demultiplexer 141 and the multiplexer 142. The amplitude adjustment coefficient CA1 is set at the amplitude adjuster 151A1, and the phase adjustment coefficient CD1 is set at the phase adjuster 152A1.

The signal adjusting unit 15An includes an amplitude adjuster 151An and a variable phase shifter 152An. The amplitude adjuster 151An and the variable phase shifter 152An are connected in series between the demultiplexer 141 and the multiplexer 142.

Amplitude adjustment coefficients and phase adjustment coefficients given to the plurality of signal adjusting units 15A1 to 15An are set by the control unit 11. These amplitude adjustment coefficients and phase adjustment coefficients are set in accordance with the reflected signal generated as the result that the first transmission signal Stx1 is reflected by the antenna ANT.

As described above, with the configuration of this embodiment, since a plurality of cancel signals generated at the plurality of signal adjusting units are synthesized and used for canceling a single type of reflected signal (a harmonic signal), the reflected signal can be further reliably canceled with the cancel signal.

REFERENCE SIGNS LIST 10, 10A, 10B, 10C, 10D, 10E transmission-reception device
11 control unit
12 antenna duplexer
131 first transmission-reception circuit
132 second transmission-reception circuit
141 demultiplexer
142 multiplexer
15, 15A, 15A1, 15An, 15B signal adjusting unit
151, 151A, 151A1, 151An, 151B amplitude adjuster
152, 152A, 152A1, 152An, 152B variable phase shifter
16, 16A, 16D detection circuit
17 antenna matching circuit
18, 18A, 18D phase-amplitude detection unit
ANT antenna

The invention claimed is:

1. A transmission-reception device executing carrier aggregation that simultaneously executes transmission and reception of a first communication band and a second communication band, comprising:
 a first radio frequency (RF) circuit that executes transmission processing for a transmission signal and reception processing for a reception signal on a first communication band;
 a second RF circuit that executes transmission processing for a transmission signal and reception processing for a reception signal on a second communication band different from the first communication band;
 an antenna duplexer that is connected between an antenna and the first RF circuit and the second RF circuit, transfers a transmission signal of the first communication band transmitted from the first RF circuit to the antenna, and transfers a received signal of the second communication band received from the antenna to the second RF circuit;
 a demultiplexer that is connected between the first RF circuit and the antenna duplexer;
 a multiplexer that is connected between the antenna duplexer and the second RF circuit;
 a detection circuit that detects:
  the transmission signal on the first communication band,
  at least one of an amplitude or a phase of a reflected harmonic signal of the transmission signal, the transmission signal of the first communication band being partly reflected by the antenna to generate the reflected harmonic signal of the transmission signal, and at least one of an amplitude or a phase of a fundamental wave signal of the transmission signal, wherein the detection circuit is connected between the antenna and the antenna duplexer;

a control unit configured to determine a first adjustment coefficient on the basis of a detection result of the reflected harmonic signal of the transmission signal, and a second adjustment coefficient on the basis of a detection result of the amplitude and the phase of the reflected a fundamental wave signal of the transmission signal; and a signal adjusting unit that is connected between the demultiplexer and the multiplexer and that is configured to adjust at least one of an amplitude or a phase of a harmonic signal of the transmission signal demultiplexed by the demultiplexer, on the basis of the first and second adjustment coefficients, and that outputs a cancelling signal to the multiplexer, wherein:

the reflected harmonic signal of the transmission signal of the first communication band due to the reflection is transferred to the antenna duplexer, the demultiplexer demultiplexes the harmonic signal of the transmission signal, and outputs the harmonic signal to the signal adjusting unit, an amplitude of the cancelling signal is the same as an amplitude of the reflected harmonic signal and a phase of the cancelling signal is the opposite of a phase of the reflected harmonic signal, the multiplexer multiplexes the reflected harmonic signal, the cancelling signal, and the received signal in the second communication band output to the second RF circuit, each of the each of the transmission signal output from the first RF circuit and the reception signal input to the first RF circuit is an RF signal of the first communication band, and each of the transmission signal output from the second RF circuit and the reception signal input to the second RF circuit is an RF signal of the second communication band.

2. The transmission-reception device according to claim 1, wherein the signal adjusting unit includes a plurality of signal adjusting sections.

3. The transmission-reception device according to claim 1, wherein the signal adjusting unit includes a delay circuit that delays the harmonic signal demultiplexed by the demultiplexer.

4. The transmission-reception device according to claim 3, wherein the delay of the delay circuit is determined on the basis of the difference between the transfer path length of the harmonic signal from the demultiplexer to the multiplexer through the signal adjusting unit, and the transfer path length of the harmonic signal from the demultiplexer to the multiplexer through reflection at the antenna.

5. The transmission-reception device according to claim 3, wherein the delay of the delay circuit is determined on the basis of the difference between the transfer path length of the harmonic signal from the demultiplexer to the multiplexer through the signal adjusting unit, and the transfer path length of the harmonic signal from the demultiplexer to the multiplexer through the antenna duplexer.

6. The transmission-reception device according to claim 1, wherein the signal adjusting unit includes a filter that is connected to the demultiplexer, the filter being configured to attenuate the transmission signal and allow the harmonic signal of the transmission signal to pass therethrough.

* * * * *

UNITED STATES PATENT AND TRADEMARK OFFICE
CERTIFICATE OF CORRECTION

PATENT NO. : 10,158,392 B2
APPLICATION NO. : 15/090686
DATED : December 18, 2018
INVENTOR(S) : Hidenori Obiya et al.

It is certified that error appears in the above-identified patent and that said Letters Patent is hereby corrected as shown below:

In the Specification

Column 4, Lines 16-17, "the first communication is Band 17," should be -- the first communication band is Band 17, --.

Signed and Sealed this
Thirtieth Day of April, 2019

Andrei Iancu
*Director of the United States Patent and Trademark Office*